(12) United States Patent
Liu et al.

(10) Patent No.: US 11,022,736 B2
(45) Date of Patent: Jun. 1, 2021

(54) METAL WIRE GRID AND ITS MANUFACTURING METHOD, AND DISPLAY PANEL

(71) Applicant: BOE TECHNOLOGY GROUP CO., LTD., Beijing (CN)

(72) Inventors: Qingzhao Liu, Beijing (CN); Jiushi Wang, Beijing (CN); Shuilang Dong, Beijing (CN); Guoqiang Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 83 days.

(21) Appl. No.: 16/408,973

(22) Filed: May 10, 2019

(65) Prior Publication Data
US 2020/0166683 A1    May 28, 2020

(30) Foreign Application Priority Data
Nov. 23, 2018    (CN) .......................... 201811409055.2

(51) Int. Cl.
*G02B 5/30*    (2006.01)
*G02B 5/02*    (2006.01)

(52) U.S. Cl.
CPC ......... *G02B 5/3058* (2013.01); *G02B 5/0294* (2013.01)

(58) Field of Classification Search
CPC .............................. G02B 1/11; G02B 5/3058
USPC ............................ 359/485.05, 487.03, 900
See application file for complete search history.

(56) References Cited

U.S. PATENT DOCUMENTS

| | | | | |
|---|---|---|---|---|
| 7,113,335 B2 * | 9/2006 | Sales | .................... | G02B 5/3058 359/485.03 |
| 7,142,363 B2 * | 11/2006 | Sato | .......................... | G01J 3/18 359/569 |
| 7,957,062 B2 * | 6/2011 | Takada | .................. | G02B 5/3025 349/96 |
| 2008/0316599 A1 * | 12/2008 | Wang | ................... | G02B 5/3058 359/485.05 |
| 2013/0120672 A1 | 5/2013 | Kumai | | |
| 2013/0286358 A1 | 10/2013 | Takahashi et al. | | |
| 2016/0202548 A1 * | 7/2016 | Lee | ........................ | G02B 5/201 349/43 |
| 2018/0299602 A1 | 10/2018 | Takeda et al. | | |
| 2019/0094435 A1 * | 3/2019 | Shen | ..................... | G02B 5/3058 |
| 2019/0137676 A1 * | 5/2019 | Nam | ....................... | C08L 83/04 |
| 2019/0331840 A1 * | 10/2019 | Takada | ................. | G02B 5/3058 |
| 2020/0174172 A1 * | 6/2020 | Dong | .................... | G02B 5/3058 |

FOREIGN PATENT DOCUMENTS

| | | | |
|---|---|---|---|
| CN | 104752309 A | | 7/2015 |
| CN | 108287383 A | | 7/2018 |
| CN | 108680982 A | | 10/2018 |
| KR | 2013000756 | * | 1/2013 |
| KR | 10-2015-0133372 A | | 11/2015 |
| WO | 2012118204 A1 | | 9/2012 |

* cited by examiner

*Primary Examiner* — Ricky D Shafer
(74) *Attorney, Agent, or Firm* — The Webb Law Firm

(57) ABSTRACT

An embodiment of this disclosure discloses a metal wire grid comprising: a patterned metal layer and a patterned antireflective layer located on the patterned metal layer, wherein a surface of the antireflective layer distal to the patterned metal layer has a plurality of continuous pits. Embodiments of this disclosure further disclose a method of manufacturing a metal wire grid and a display panel.

5 Claims, 4 Drawing Sheets

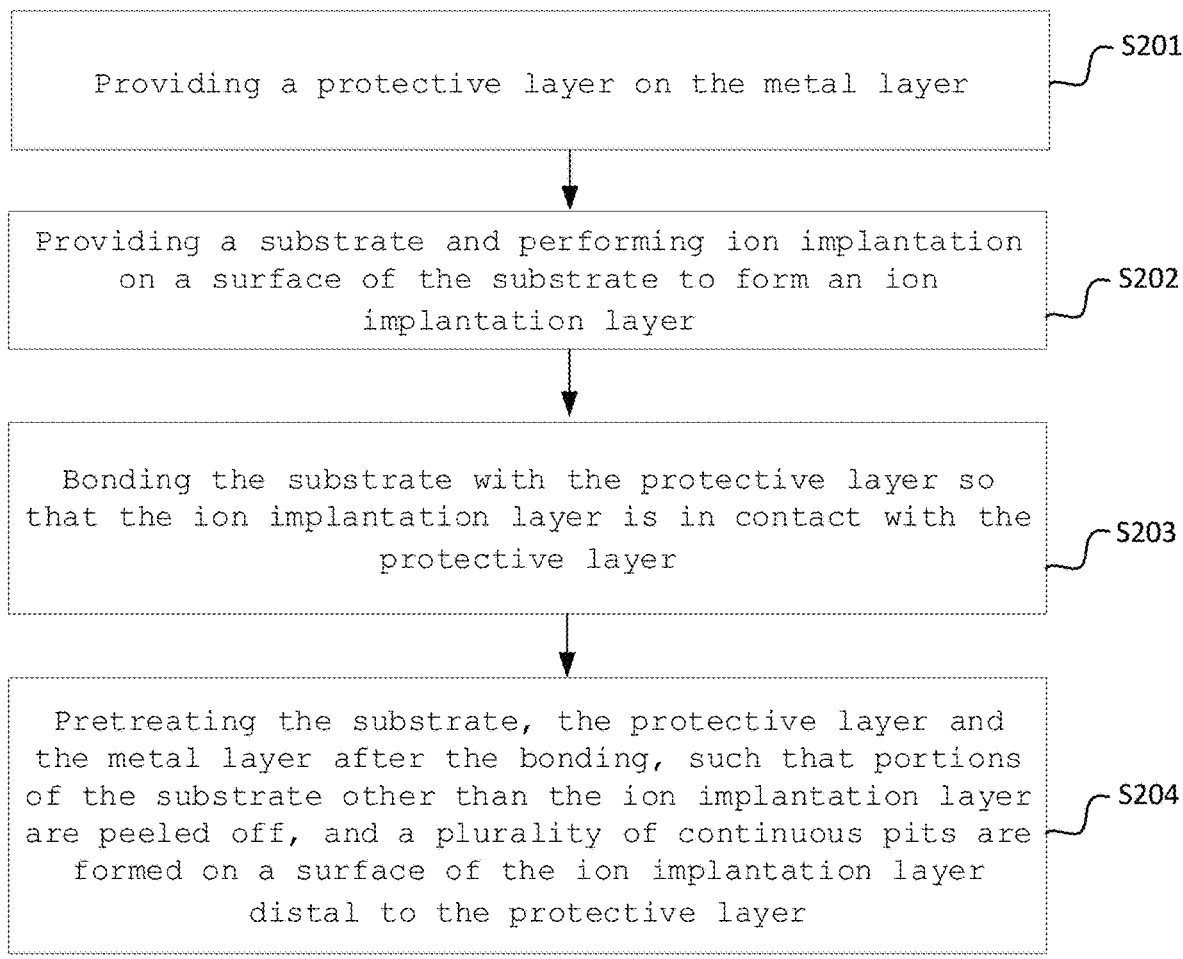
FIG. 3A
FIG. 3B
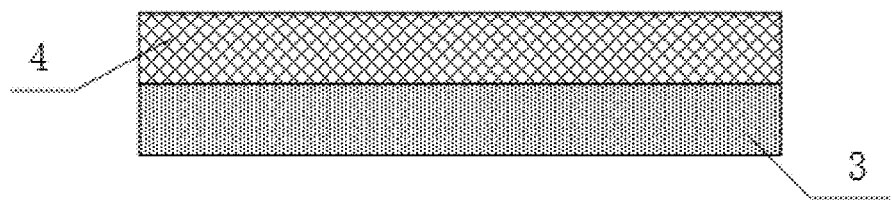
FIG. 4A

METAL WIRE GRID AND ITS MANUFACTURING METHOD, AND DISPLAY PANEL

CROSS-REFERENCE TO RELATED APPLICATIONS

This application claims the benefit of priority to Chinese Patent Application No. 201811409055.2, filed on Nov. 23, 2018, which is hereby incorporated by reference in its entirety into this application as a part of this application.

TECHNICAL FIELD

This disclosure relates to a metal wire grid and its manufacturing method and a display panel.

BACKGROUND

With the development of science and technology and the progress of times, liquid crystal display has become an indispensable important product in people's lives, wherein the principle of the liquid crystal display is that, by means of the birefringence properties of liquid crystal, and by controlling the rotation of the liquid crystal with the voltage, the linearly polarized light passing through the lower polarizer rotates in the liquid crystal layer with the rotation of the liquid crystal and then goes into the upper polarizer. The polarization direction of the upper polarizer is perpendicular to the polarization direction of the lower polarizer, such that the upper polarizer, the lower polarizer and the liquid crystal cell play a role of an optical switch.

As compared with the traditional absorption-type polarizer, the metal wire grid polarizer can transmit the incident light the polarization direction of which is perpendicular to the direction of the wire grid, and reflect the incident light the polarization direction of which is parallel to the direction of the wire grid.

SUMMARY

An embodiment of this disclosure discloses a metal wire grid comprising:
  a patterned metal layer and a patterned antireflective layer located on the patterned metal layer, wherein
  a surface of the antireflective layer distal to the patterned metal layer has a plurality of continuous pits.

In one or more embodiments of the present disclosure, the antireflective layer comprises a protective layer located on the patterned metal layer and an ion implantation layer located on the protective layer, and wherein a surface of the ion implantation layer distal to the protective layer has the plurality of continuous pits.

In one or more embodiments of the present disclosure, the ion implantation layer is formed by implanting ions into a surface of a substrate.

In one or more embodiments of the present disclosure, the implanted ion comprises any of hydrogen ions, helium ions or oxygen ions.

In one or more embodiments of the present disclosure, a material of the substrate includes silicon.

In one or more embodiments of the present disclosure, a material of the protective layer includes silicon oxide.

In one or more embodiments of the present disclosure, a material of the patterned metal layer includes aluminum.

In one or more embodiments of the present disclosure, a thickness of the patterned metal layer is between 100 mm and 200 mm.

An embodiment of this disclosure discloses a display panel comprising a first substrate and a second substrate facing each other, a first polarizer located on a side of the first substrate distal to the second substrate, a second polarizer located on a side of the second substrate distal to the first substrate; wherein at least one of the first polarizer and the second polarizer is a metal wire grid, the metal wire grid comprising:
  a patterned metal layer located on a side of one of the first polarizer and the second polarizer distal to the other one, and a patterned antireflective layer located on a side of the patterned metal layer distal to the one of the first polarizer and the second polarizer, wherein a surface of the antireflective layer distal to the patterned metal layer has a plurality of continuous pits.

An embodiment of this disclosure discloses a display device, comprising the display panel as described above.

An embodiment of this disclosure discloses a method of manufacturing a metal wire grid, comprising: providing a metal layer, providing a antireflective layer on the metal layer, wherein a surface of the antireflective layer distal to the metal layer has a plurality of continuous pits, and patterning the metal layer and the antireflective layer through a pattering process to form a metal wire grid.

In one or more embodiments of the present disclosure, wherein
  providing a antireflective layer on the metal layer comprises:
  providing a protective layer on the metal layer;
  providing a substrate and performing ion implantation on a surface of the substrate to form an ion implantation layer;
  bonding the substrate with the protective layer so that the ion implantation layer is in contact with the protective layer;
  pretreating the substrate, the protective layer and the metal layer after the bonding, such that portions of the substrate other than the ion implantation layer are peeled off, and a plurality of continuous pits are formed on a surface of the ion implantation layer distal to the protective layer; and
  patterning the metal layer and the antireflective layer through a pattering process comprises:
  patterning the metal layer, the protective layer and the ion implantation layer through a pattering process to form a metal wire grid.

In one or more embodiments of the present disclosure, performing ion implantation on a surface of the substrate comprises:
  implanting any of hydrogen ions, helium ions or oxygen ions into the surface of the substrate.

In one or more embodiments of the present disclosure, pretreating the substrate, the protective layer and the metal layer after the bonding comprises:
  heat-treating the substrate, the protective layer and the metal layer after the bonding.

In one or more embodiments of the present disclosure, a material of the substrate includes silicon.

The above description is merely an overview of the technical solutions of the embodiments of this disclosure. In order to better understand the technical means of the embodiments of this disclosure, such that they can be carried out in accordance with the content of the specification, and in order to make the above and other purposes, features and advantages of the embodiments of this disclosure more clear and understandable, specific implementations of the embodiments of this disclosure are listed below.

BRIEF DESCRIPTION OF THE DRAWINGS

By reading a detailed description of the alternative embodiments below, a variety of other advantages and benefits will become very clear to those skilled in the art. The accompanying drawings are used only to show the purpose of the alternative embodiments and are not considered as restrictions to the embodiments of this disclosure. And throughout the drawings, the same reference sign represents the same composite part, in which

FIGS. 3A and 3B are specific flowcharts showing the method of manufacturing a metal wire grid according to an embodiment of this disclosure; and FIGS. 4A-4G are schematic diagram showing the structures corresponding to the steps in FIG. 2 and FIGS. 3A and 3B according to an embodiment of this disclosure.

DETAILED DESCRIPTION

Figure 1:
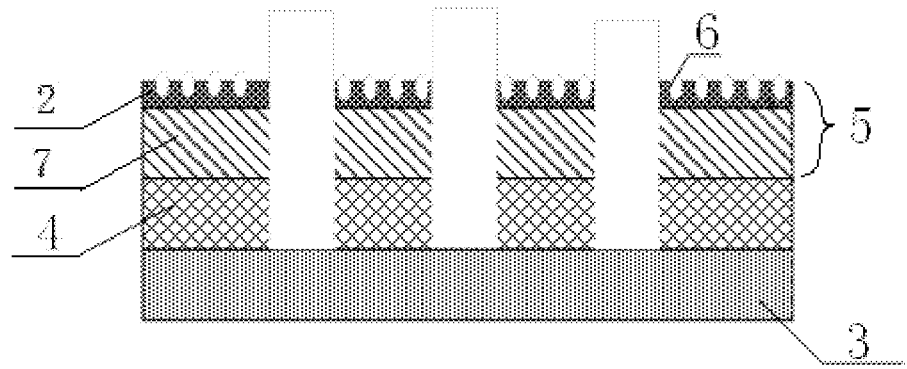
FIG. 1 is a schematic diagram showing a structure of a metal wire grid according to an embodiment of this disclosure.

The illustrative embodiments of this disclosure will be described in more detail with reference to the accompanying drawings below. Although the illustrated embodiments of this disclosure are shown in the drawings, it should be understood that this disclosure can be implemented in various forms and should not be limited by the embodiments described here. Instead, these embodiments are provided in order to have a more thorough understanding of the disclosure and to be able to communicate the scope of this disclosure to those skilled in the art in a complete manner.

As shown in FIG. 1, an embodiment of this disclosure provides a metal wire grid comprising: a patterned metal layer 4 and an antireflective layer 5 located in turn on the base substrate 3. A surface of the antireflective layer 5 distal to the metal layer 4 has a plurality of continuous pits 6 with a certain distance between the adjacent pits.

Since the metal wire grid in the embodiment of this disclosure is provided with an antireflective layer on the surface of its metal layer, and the surface of the antireflective layer has a plurality of continuous pits, the antireflective layer can absorb a part of the light(for example, ambient light, natural light, sunlight) irradiated to the surface of the metal wire grid, and the uneven structure can play a role of diffusing reflection. Thus, the antireflection effect of the antireflective layer can reduce the reflection of the light from the metal wire grid, improve the display contrast, and enhance the display effect.

Specifically, as shown in FIG. 1, the antireflective layer 5 includes a protective layer 7 and a ion implantation layer 2 located in turn on the metal layer 4. A material of the protective layer includes silicon oxide, and for those skilled in the art, other suitable materials can also be selected. The surface of the ion implantation layer 2 distal to the protective layer 7 and the ion implantation layer 2 has a plurality of continuous pits 6, and there is a certain distance between the adjacent pits 6.

By providing a plurality of continuous pits 6 on the surface of the ion implantation layer 2 distal to the protective layer 7, the light irradiated on such surface of the surface of the ion implantation layer 2 can be absorbed and the light reflected from this surface can be reduced, so as to achieve the effect of antireflection. The ion implantation layer 2 is formed by implanting ions into a surface of a substrate. The implanted ion comprises any of hydrogen ions, helium ions or oxygen ions, and a material of the substrate includes silicon. The method of forming the ion implantation layer 2 will be specifically described latter. By forming the ion implantation layer 2 with ion implantation technic, for example, it will facilitate the formation of the antireflective layer 5, and the forming process can be simplified. In addition, for example, the thickness of the ion implantation layer 2 and the size and dense of the pits 6 can be controlled based on the dose of the implanted ion, so as to form an ideal antireflective layer 5.

In an alternative embodiment, a material of the metal layer 4 includes aluminum, and the base substrate 3 can be made of glass or resin material. However, for those skilled in the art, other suitable materials can also be selected. In addition, a thickness of the metal layer 4 can be between 100 mm and 200 mm. The metal wire grid formed by the metal aluminum with a thickness between 100 mm and 200 mm has good polarization characteristics.

Based on the same concept, an embodiment of this disclosure provides a display panel, comprising a first substrates and a second substrate facing each other, a first polarizer located on a side of the first substrate distal to the second substrate, and a second polarizer located on a side of the second substrate distal to the first substrate. The first polarizer can be a metal wire grid according to the embodiment of this disclosure. In one embodiment, the second polarizer can be a metal wire grid according to the embodiment of this disclosure. In another embodiment, both the first polarizer and the second polarizer can be the metal wire grid according to the embodiment of this disclosure.

Specifically, the first substrate in the embodiment of this disclosure may be an array substrate, and the second substrate may be a color film substrate. Since at least one of the first polarizer and the second polarizer adopts the metal wire grid according to the embodiment of this disclosure, based on the above statement of the metal wire grid, the display panel provided by the embodiment of this disclosure has a higher display contrast and a better display effect.

Based on the same concept, the embodiment of this disclosure provides a display device comprising the display panel according to the embodiment of this disclosure. Since the display device according to the embodiment of this disclosure includes the display panel according to the embodiment of this disclosure, based on the above statement of the metal wire grid and the display panel, the display device has a higher display contrast and a better display effect.

Figure 2:
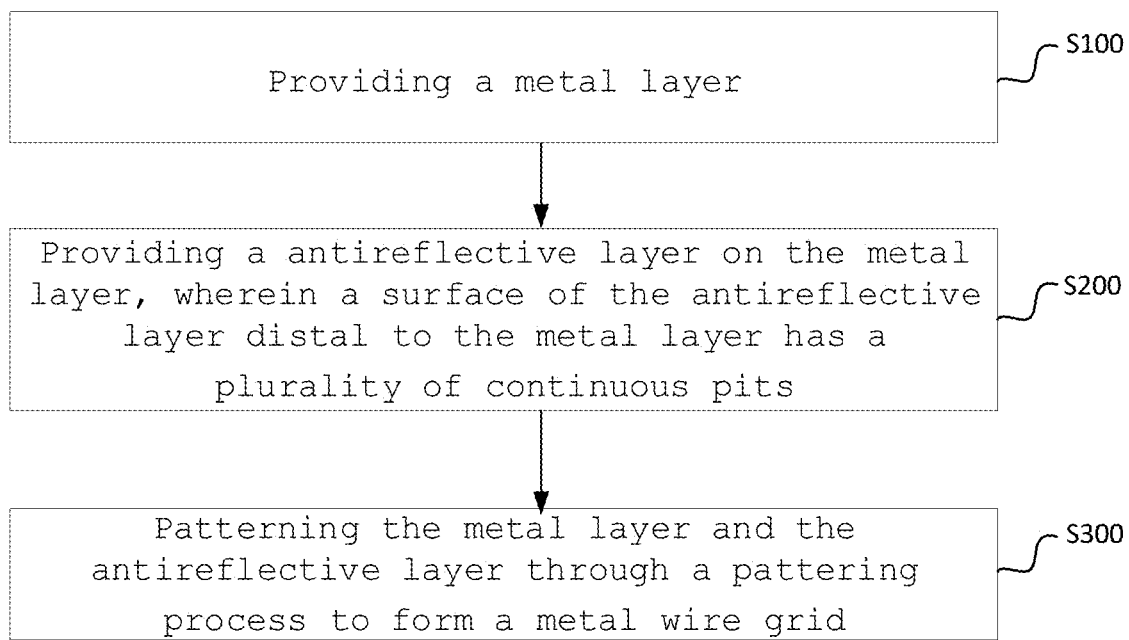
FIG. 2 is a flowchart showing a method of manufacturing a metal wire grid according to an embodiment of this disclosure.

Based on the same idea, an embodiment of this disclosure discloses a method of manufacturing a metal wire grid, as shown in FIG. 2, comprising:

S100, providing a metal layer,

S200, providing a antireflective layer on the metal layer, wherein a surface of the antireflective layer distal to the metal layer has a plurality of continuous pits, and S300, patterning the metal layer and the antireflective layer through a pattering process to form a metal wire grid.

As shown in FIG. 4A, in step 100, the metal layer 4 can be formed on the base substrate 3. In the embodiment of the present disclosure, the base substrate 3 can be made of glass or resin material, and a material of the metal layer 4 can be aluminum. In particular, in this step, an aluminum layer 4 is deposited on the glass substrate 9.

Figure 4B:
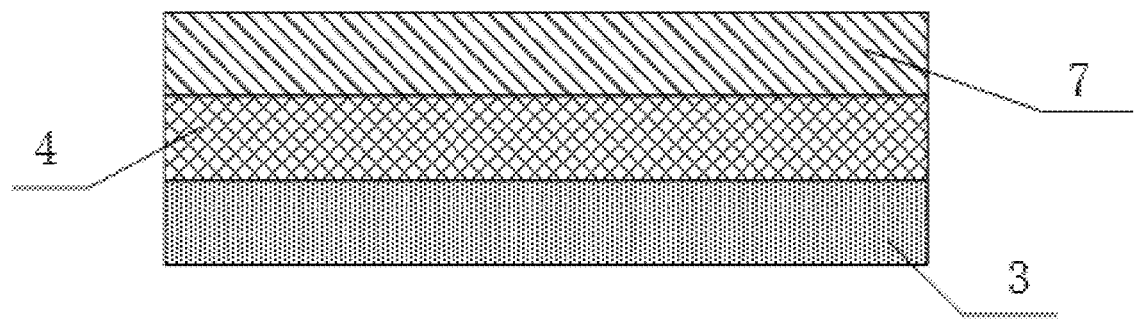

As shown in FIG. 3A, the step S200 comprises the following steps:

S201, providing a protective layer on the metal layer. As shown in FIG. 4B, in step 201, a metal layer 4 is provided on the protective layer 7. A material of the protective layer 7 can be silicon oxide layer. In particular, in this step, a silicon oxide layer 7 is deposited on the metal layer 4.

S202, providing a substrate and performing ion implantation on a surface of the substrate to form an ion implantation layer. As shown in FIG. 4B, ion implantation is performed on a upper surface of the substrate 1, so as to form an ion implantation layer 2. By taking a silicon wafer 7 as an example for the substrate in the embodiment of this disclosure, any of hydrogen ions ($H^+$), helium ions ($He^+$) or oxygen ions ($O^{2-}$) can be implanted on the surface of the silicon wafer 7, and an ion implantation layer 2 is formed on the surface of the silicon wafer 7. For example, H+ will break the S—Si bond and thus point defects will be formed in the silicon, and Si—H bonds are formed by some silicon. The step S201 shown in FIG. 4B can be carried out at the same time with the step S101 shown in FIG. 4A, before the step S101 shown in FIG. 4A, or after the step S101 shown in FIG. 4A. In this embodiment, depending on the cost and actual effect, the material of the substrate can include silicon. Of course, substrates of other suitable materials can also be used. The person skilled in the art will understand that the step S201 can be performed after the step S202 or performed simultaneously with step S202.

Figure 4C:
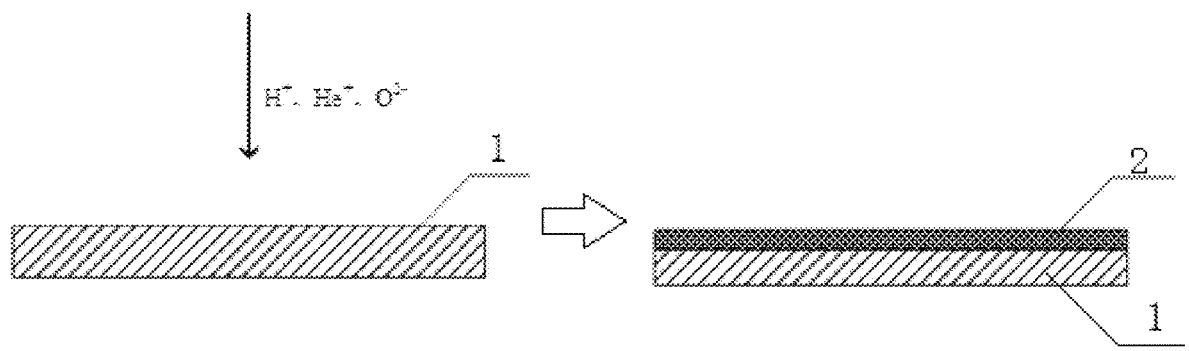

S203, bonding the substrate with the protective layer such that the ion implantation layer is in contact with the protective layer. As shown in FIG. 4C, the substrate 1 having the ion implantation layer 2 shown in FIG. 4B is turned over, and the substrate 1 and the protective layer 7 on the base substrate 3 are bonded together, such that the ion implantation layer 2 is in contact with the protective layer 7.

Figure 4D:
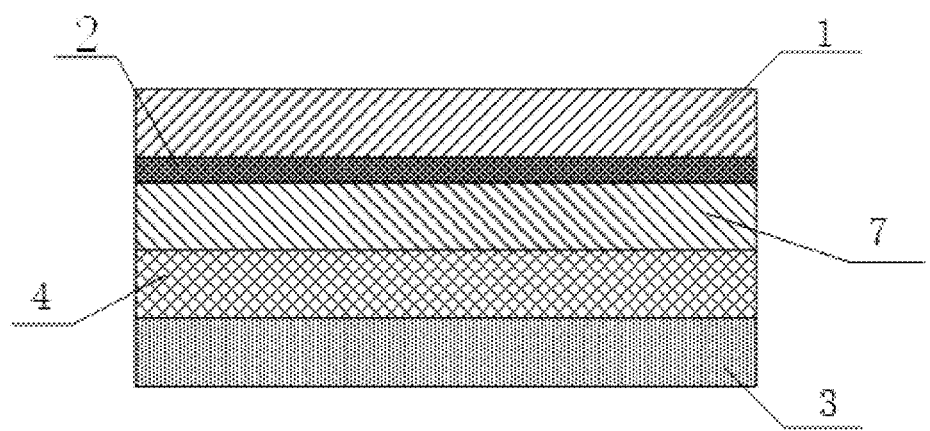

S204, pre-treating the substrate, the protective layer and the metal layer after the bonding, so that the portions of the substrate other than the ion implantation layer are peeled off, and a plurality of continuous pits are formed on a surface of the ion implantation layer distal to the protective layer. As shown in FIG. 4D, pre-treating comprises heat treating the silicon wafer 1 and the base substrate 3 after the bonding at about 500° C., the point defects formed in silicon by $H^+$ according to the above description overlap with each other in the case of heating to form multiple voids, and hydrogen is formed in the voids. The internal pressure in the voids rises due to the hydrogen in the case of heating, while the hydrogen in the silicon diffuses towards the implantation peak, and is gathered to form micro-bubbles filled with hydrogen. The number of the bubbles increases with the heat treatment, and finally, the portions of the substrate 1 other than the ion implantation layer 2 are peeled off. Therefore, the ion implantation layer 2 formed on the silicon oxide layer 7 has a bubble type continuous cavity, and thus has the function of absorbing light. In addition, the stripped substrate can be recycled and reused as a substrate for ion implantation in the next stripping. In this embodiment, the temperature of the heat treatment is about 500° C., but for those skilled in the art, an appropriate temperature can be selected according to actual situations.

Figure 4E:
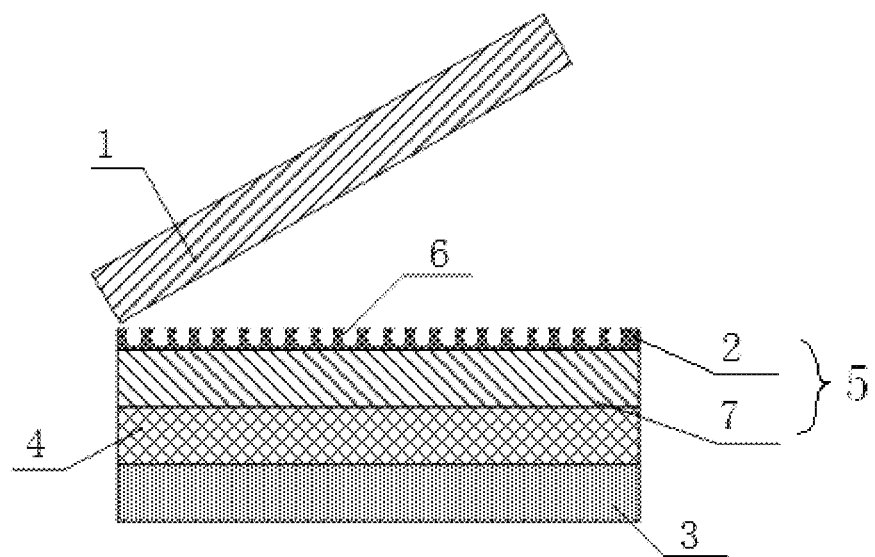
Figure 4F:
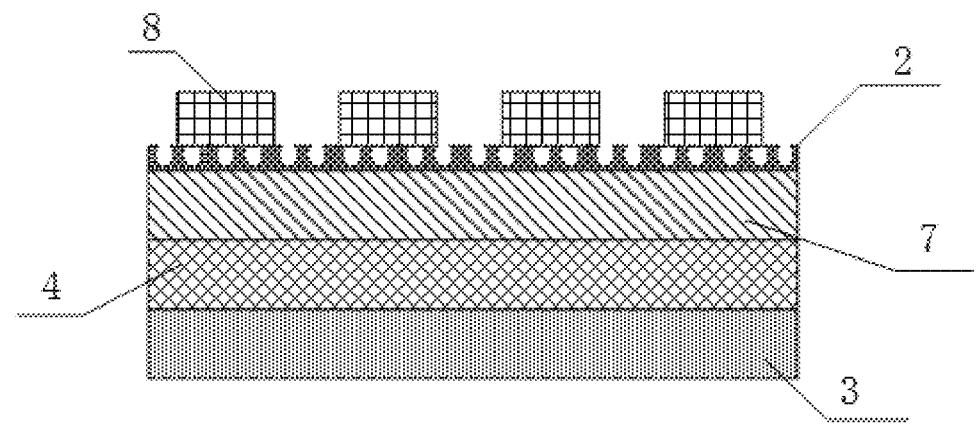
Figure 4G:
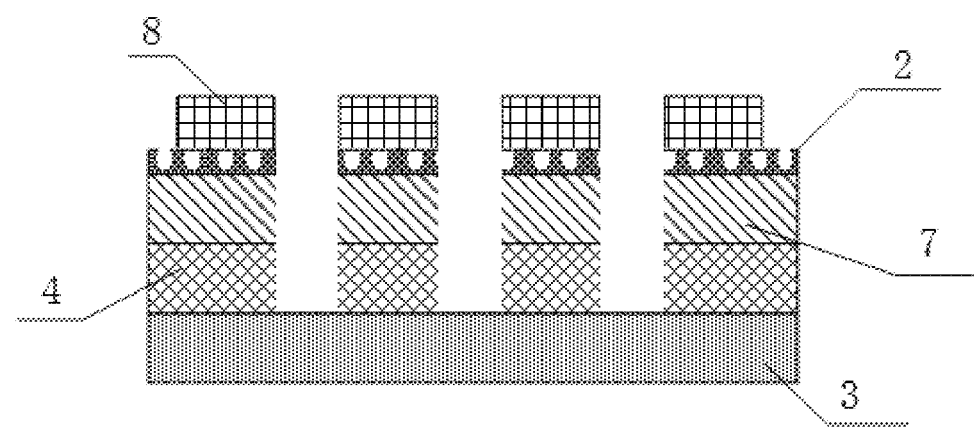

As shown in FIG. 3C, step S300 comprises the following step:

S301, patterning the metal layer, the protective layer and the ion implantation layer through a pattering process to form a metal wire grid. As shown in FIG. 4E, the surface of the ion implantation layer 2 is coated with a photoresist 8, and a nano-imprint or exposure process is used for pattering the photoresist 8, to form a photoresist wire grid. Then, as shown in FIG. 4F, the portions of the ion implantation layer 2, the protective layer 7 and the metal layer 4 not covered by the photoresist 8 are etched. During the etching process, the protective layer 8 can act as a hard mask, to protect the metal layer 4. Finally, the photoresist is removed to form the metal wire grid according to the embodiment of this disclosure, and the structure of the metal wire grid is shown in FIG. 1.

An array substrate can be fabricated on the basis of the metal wire grid manufactured according to the embodiment of this disclosure, i.e., fabricating the film layers required for the array substrate on the ion implantation layer. During fabrication, an insulating layer is firstly formed on the ion implantation layer. Since the roughness of the metal wire grid surface will increase after deposition of insulating layer, in order not to affect the subsequent fabrication of the thin film transistor, a planarization layer should be coated on the surface of the insulating layer. The planarization layer can adopts high transmittance resin or other suitable materials.

The metal wire grid according to the embodiment of this disclosure is provided with an antireflective layer on the surface of its metal layer. The surface of the antireflective layer has a plurality of continuous pits, and thus the antireflective layer can absorb a part of the natural light irradiated to the surface of the metal wire grid, and the uneven structure can play a role of diffusing reflection. Therefore, the antireflection effect of the antireflective layer can reduce the reflection of the ambient light from the metal wire grid, improve the display contrast, and enhance the display effect.

In addition, the embodiment of this disclosure utilizes the stripping technology to manufacture the antireflective layer, which can significantly reduce manufacturing difficulties and costs.

The above is merely part of the embodiments of this disclosure, and it should be noted that, those skilled in the art could also make various modifications and improvements, without departing from the principle of this disclosure, and all these modifications and improvements should also be considered as the scope of protection of this disclosure.

What is claimed is:

1. A method of manufacturing a metal wire grid, comprising:
   providing a metal layer,
   providing a antireflective layer on the metal layer, wherein a surface of the antireflective layer distal to the metal layer has a plurality of continuous pits, and
   patterning the metal layer and the antireflective layer through a patterning process to form a metal wire grid,
   wherein providing the antireflective layer on the metal layer comprises:
   providing a protective layer on the metal layer;
   providing a substrate and performing ion implantation on a surface of the substrate to form an ion implantation layer;
   bonding the substrate with the protective layer so that the ion implantation layer is in contact with the protective layer; and
   pretreating the substrate, the protective layer, and the metal layer after the bonding, such that portions of the substrate other than the ion implantation layer are peeled off, and the plurality of continuous pits are formed on a surface of the ion implantation layer distal to the protective layer.

2. The manufacturing method according to claim 1, wherein patterning the metal layer and the antireflective layer through the pattering process comprises:

patterning the metal layer, the protective layer, and the ion implantation layer through a pattering process to form the metal wire grid.

3. The manufacturing method according to claim 2, wherein performing ion implantation on a surface of the substrate comprises:

implanting any of hydrogen ions, helium ions or oxygen ions into the surface of the substrate.

4. The manufacturing method according to claim 2, wherein pretreating the substrate, the protective layer and the metal layer after the bonding comprises:

heat-treating the substrate, the protective layer and the metal layer after the bonding.

5. The manufacturing method according to claim 2, wherein a material of the substrate includes silicon.

\* \* \* \* \*